June 5, 1962 H. L. CAHN 3,037,882
COATING COMPOSITION COMPRISING A COPOLYMER OF VINYL
TOLUENE-BUTADIENE, CHLORINATED BIPHENYL, AND
CHLORINATED TERPHENYL, AND
ARTICLE COATED THEREWITH
Filed April 22, 1960
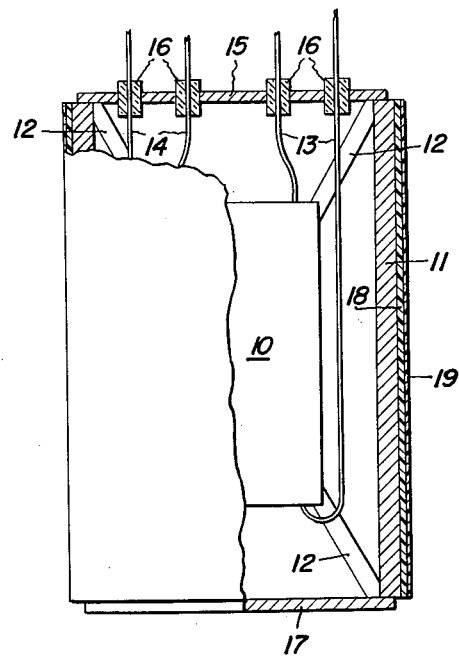
*Inventor:*
Harold L. Cahn,
by Robert P. Friedman
*His Attorney.*

United States Patent Office 3,037,882
Patented June 5, 1962

3,037,882
COATING COMPOSITION COMPRISING A CO-
POLYMER OF VINYL TOLUENE-BUTADIENE,
CHLORINATED BIPHENYL, AND CHLORIN-
ATED TERPHENYL, AND ARTICLE COATED
THEREWITH
Harold L. Cahn, Schenectady, N.Y., assignor to General
Electric Company, a corporation of New York
Filed Apr. 22, 1960, Ser. No. 24,113
4 Claims. (Cl. 117—75)

The present invention relates to a coating composition and is more particularly directed to coating compositions useful in the coating of bodies on which there is an undercoating of silicone resin. This invention also relates to the coated articles prepared by the application of this coating composition to a body which has been previously coated with a silicone resin.

Silicone resins have found increasing usage in the insulation of electrical apparatus such as transformers and dynamoelectric machines. A particular advantage of silicone resin insulating materials is their ability to withstand high electrical stresses and high temperatures. In the manufacture of various types of electrical apparatus such as transformers and dynamoelectric machines, a coil or coils of insulated electrical conductors are wound around a core to form a core assembly with the shape and type of the coil and the core depending on the particular apparatus in question. The insulation on these electrical conductors is usually of any one of a variety of well known types. These insulating materials are usually organic in nature, as distinguished from silicone resin insulation, and have certain limitations as to temperature of operation. In order to upgrade the temperature at which the organic insulation on the conductors can operate and to improve the electrical properties of the insulation, it is established practice to over-coat the entire core assembly with a silicone resin. In practice, these core assemblies are mounted in a suitable housing prior to coating of the assembly with a silicone resin so that the entire assembly can be handled by contact with the housing, which is conventionally made of steel. This eliminates the need for mechanical handling of the core assembly and lessens the risk of damage to the core assembly. Thus, in the case of transformers, the core assembly is attached to its housing and then the entire housed assembly is dipped into a solution of a silicone resin to impregnate the core assembly with the silicone resin solution and to coat the housing with the silicone resin solution. The housed assembly is then withdrawn from the resin solution and heated at an elevated temperature, for example a temperature of 130 to 160° C. to evaporate the solvent from and to cure the silicone resin.

While the electrical properties of electrical apparatus so treated are satisfactory, it is often found that the appearance of the apparatus is unsatisfactory because of blemishes on the surface of the metal from which the housing is formed or because of differences in the color appearance of electrically identical units.

To provide uniformity of appearance between electrically identical units and to improve the appearance of such electrical units, it is desirable to apply a pigmented coating composition to the housing of such units. However, the application of pigmented coating compositions to these housings has presented serious problems in that the silicone resin coated surfaces of such units are highly inert and non-receptive to coatings of conventional, pigmented coated compositions. Furthermore, the compositions of most conventional pigmented coating compositions are such that application of the pigmented coating composition to the surface of the housing tends to soften and destroy the silicone resin coating composition, again resulting in poor and non-uniform appearance of the completed apparatus.

It is an object of the present invention to provide an improved pigmented coating composition.

It is a still further object of this invention to provide an improved pigmented coating composition especially adapted for the coating of silicone resin coated articles.

It is a still further object of the present invention to provide an improved coated article having a pigmented coating composition attached to the surface of the object, with a silicone resin coating interposed between the pigmented coating composition and the surface of the article.

These and other objects of my invention may be better understood by reference to the following detailed description taken in connection with the drawing which is a schematic view, partly in section, of a transformer treated in accordance with the practice of the present invention.

Briefly, the coating composition of the present invention comprises a blend of (a) a copolymer of a major portion of vinyl toluene and a minor portion of butadiene, (b) a chlorinated biphenyl, (c) a chlorinated terphenyl, and (d) a pigment. This invention is also concerned with silicone resin coated articles coated with the foregoing composition.

The individual components of the coating composition of the present invention are all well known in the art. Evaluation of these individual components show that none of the components are satisfactory as a coating composition to be applied over the surface of silicone resin coated surfaces. It is the combination of the particular components in the particular recited proportions which provides the novel features of the present invention.

The vinyl toluene-butadiene copolymer employed in the practice of the present invention is prepared by means well known in the art by the copolymerization of a mixture of the two monomers in the ratio of from about 1 mole to 7 moles of vinyl toluene per mole of butadiene. These materials are resinous in nature as distinguished from the rubbery copolymers prepared by reacting the ingredients in the ratio of more moles of butadiene than moles of vinyl toluene as is done in the preparation of synthetic rubbers.

The copolymerization of the vinyl toluene and butadiene is carried out by the same method as is shown, for example, in Patent 2,611,719, Borders, for the preparation of copolymers of styrene and butadiene. The vinyl toluene which is employed in the preparation of the copolymer can be any of the three isomeric vinyl toluenes with the meta-vinyl toluene being preferred. The butadiene employed is preferably butadiene-1,3. The vinyl toluene-butadeine copolymers which are particularly useful in the practice of the present invention are those solid, resinous copolymers which have a molecular weight in the range of from 1,000 to 20,000. These materials are well known in the art and commercially available, one such material being sold under the trade name Pliolate VT by the Goodyear Tire and Rubber Company.

The chlorinated biphenyls employed in the practice of the present invention are also well known and described at various places in the art. For example, chlorinated biphenyl (chlorinated phenylbenzene) is described in Patent 1,887,678, Gardner. The physical state of chlorinated biphenyl depends to a large extent on the chlorine content which can range from about 20 to 80 percent by weight of the chlorinated biphenyl. Lower chlorine contents yield oily materials while chlorinated biphenyl containing 60 to 80 percent chlorine are usually solid masses. One chlorinated biphenyl which is particularly useful in the composition of the present invention is the product sold commercially under the name Aroclor 1254 by the Monsanto Chemical Company.

Chlorinated terphenyls are also described in a number of places in the literature, particular reference being directed to Patent 2,551,562, Jenkins. The chlorinated terphenyls (chlorinated diphenylbenzene) which can be employed in the practice of the present invention are generally prepared by chlorination of any of the isomeric diphenylbenzenes or mixtures of such isomers. These materials generally have chlorine contents of from about 40 to 80 percent and are all relatively hard, solid materials. A particularly useful chlorinated terphenyl for purposes of the present invention is the product sold as Aroclor 5460 by the Monsanto Chemical Company.

The selection of the pigment to be employed in the composition of the present invention depends entirely on the desired color and the operating temperature to which the coated apparatus is to be subjected. Among the preferred pigments are the inorganic pigments commonly employed in the art which may be used on apparatus adapted for service at elevated temperatures. However, there can be a number of circumstances in which the apparatus is not required to operate at these elevated temperatures and therefore even the organic pigments can be employed. Among the many types of pigments which can be employed in the composition of the present invention can be mentioned, for example, titanium dioxide, titanium calcium pigment, titanium barium pigment, zinc oxide, red lead, red iron oxide, zinc chromate, diatomaceous silica, precipitated whiting, china clay, lithopone, zinc sulfide, Prussian blue, toluidine toner, yellow iron oxide, chrome green, chrome yellow, black iron oxide, lampblack, molybdate orange, etc.

The proportions of the various reactants which can be employed in the preparation of the compositions of the present invention can also vary within fairly wide limits. However, for optimum properties, it is preferred that the composition contain (a) from 25 to 60 parts by weight of the copolymer of the major portion of vinyl toluene and a minor portion of butadiene, (b) from 15 to 40 parts by weight of chlorinated biphenyl, and (c) from 15 to 40 parts by weight of the chlorinated terephenyl. The amount of pigment in the coating composition is best described in terms of parts by volume rather than parts by weight. On this basis it is preferred to employ from 50 to 100 parts by volume of the pigment per 100 parts by volume of the other three essential ingredients of the composition. The most preferred compositions of the present invention comprise 50 parts by weight of the copolymer of a major portion of vinyl toluene and a minor portion of butadiene, from 20 to 30 parts by weight of chlorinated biphenyl and from 20 to 30 parts by weight of chlorinated terphenyl. Preferably the pigment comprises 80 parts by volume per 100 parts by volume of the other three ingredients.

Since the copolymer and the chlorinated terphenyl employed in the coating compositions of the present invention as well as the pigment are always solids, while the chlorinated biphenyl may in some cases also be a solid material, it is necessary to provide a solvent for the composition in order to render it useful as a coating composition. For this purpose it has been found that suitable solvents comprise a major portion e.g., from about 60 to 100 percent by weight of an aliphatic hydrocarbon solvent and from about 0 to 40 percent by weight of an aromatic hydrocarbon solvent. Preferably the solvent contains at least 70 percent by weight of aliphatic materials. One of the aliphatic hydrocarbon solvents especially suited for use in preparing solutions of the coating compositions of the present invention is aliphatic mineral spirits. Where the solvent is to contain an aromatic component, it has been found that suitable components include, for example, benzene, toluene, xylene, etc. It has been found that when the solvent is predominantly aromatic in nature, a satisfactory solution of the ingredients of the coating composition can be prepared, but when the coating is applied to a silicone resin coated article the coating tends to soften the silicone resin and cause breakdown of the total insulation of the system. While the amount of solvent employed is not critical, we prefer to employ sufficient solvent so that the solvent comprises at least 40 percent by weight of the solution of the coating composition.

The coating composition can be readily prepared by first mixing the copolymer, the chlorinated biphenyl and the chlorinated terphenyl in the solvent and agitating the mixture until the copolymer, the biphenyl and the terphenyl have gone into solution. The pigment is then dispersed in the solution in conventional fashion. Alternatively, the ingredients can all be added to the solvent and the entire mixture milled to facilitate the solution of the solid materials and dispersion of the pigment. In addition to carrying out these operations at room temperature, elevated temperatures such as temperatures up to about 50° C. can be employed.

The solution of the composition of the present invention is then applied to silicone resin coated article by any desirable means. For example, the composition can be sprayed onto the surface of the apparatus, which can be maintained at room temperature to allow the solvent to evaporate, resulting in a coated, silicone resin insulated apparatus having a hard coating of any desirable color which adheres tenaciously to the silicone resin insulated apparatus. In addition to allowing the solvent to evaporate at room temperature, elevated temperatures may be employed to speed up evaporation of the solvent. In addition to applying the coating composition by the spray method previously described, the coating composition may also be applied by application with a brush.

Thet silicone resins employed in the silicone resin insulated apparatus are also well known in the art. These silicone resins are described in a number of places in the art such as in Patents 2,258,218, Rochow; 2,258,219, Rochow; 2,258,220, Rochow; 2,258,221, Rochow, and 2,258,222, Rochow. Silicone resins of this type are also described in "An Introduction to The Chemistry of Silicones," 2nd edition, E. G. Rochow, John Wiley & Sons, Inc., New York (1951).

These silicone resins are described generically by the formula:

(1) 

$$(R)_n SiO_{\frac{4-n}{2}}$$

where $n$ has a value of from 1.0 to 1.8, inclusive, and R represents organic groups attached to silicon through a silicon carbon linkage and preferably represents monovalent hydrocarbon radicals and halogenated monovalent hydrocarbon radicals. Among the specific radicals represented by R are included, for example, alkyl radicals, e.g., methyl, ethyl, propyl, isopropyl, butyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloalkyl radicals, e.g., cyclohexyl, cycloheptyl, etc. radicals; cyanoalkyl radicals, e.g., cyanoethyl, cyanomethyl, cyanopropyl, etc. radicals; chlorinated monovalent hydrocarbon radicals, e.g., chlorophenyl, chloromethyl, tetrachlorophenyl, etc radicals. These organopolysiloxane resins can be described generically as containing an average of from 1.0 to 1.8 silicon-bonded organic radicals per silicon atom with any remaining valences of silicon being satisfied by siloxane linkages.

The method of preparation of these organopolysiloxanes is also well known in the art. These organopolysiloxanes are generally prepared by the hydrolysis and condensation of mixtures of various organochlorosilanes. Thus, for example, a typical organopolysiloxane resin is prepared by hydrolyzing a mixture of equimolar amounts of phenyltrichlorosilane and dimethyldichlorosilane in water and an organic solvent such as toluene and neutralizing the reaction mixture with a weak base such as sodium bicarbonate. This neutralized material is then isolated and redissolved in an organic solvent, such as toluene or butanol, to form an organopolysiloxane resin solution, generally containing about 35 to 50 percent solids.

Other organopolysiloxane resins are prepared in the manner described above employing other organochlorosilanes such as methyltrichlorosilane, phenyltrichlorosilane, dimethyldichlorosilane, diphenyldichlorosilane, methylphenyldichlorosilane, methyl-$\beta$-cyanoethyldichlorosilane, chlorophenyltrichlorosilane, and mixtures of one or more of these organochlorosilanes. Preferably the organochlorosilanes are selected so that the final silicone resin composition contains organic groups which are from 25 to 70 percent phenyl groups. The preferred organopolysiloxane resin is one in which all of the organo groups are methyl groups and phenyl groups.

The organic solvent for the organopolysiloxane resin can be any of the solvents which are well known in the art and have been used for this purpose. Particular solvents useful in the practice of the present invention include, for example, benzene, toluene, xylene, butanol, acetone, etc.

The present invention may be best understood by reference to the drawing which shows a core assembly 10 containing a suitable core (not shown) which can be formed of soft iron surrounded by primary and secondary coils (not shown) of insulated electrical conductors (not shown). Core assembly 10 is attached to housing 11, which may be formed of any suitable metal and which is usually composed of steel, by means of suitable insulating supports 12. Primary winding leads 13 and secondary windings 14 are suitably attached to core assembly 10 and extend above the top of housing 11. In finished form, leads 13 and 14 extend through housing top 15 and are electrically separated therefrom by means of insulators 16. Housing bottom 17 is provided to close the entire housing.

In the practice of the present invention, after core assembly 10 is affixed to housing 11 by means of supports 12, but before housing top 15 and housing bottom 17 are affixed, the assembly is dipped into a silicone resin solution so as to impregnate core assembly 10 with the silicone resin and at the same time to provide a silicone resin coating on housing 11, supports 12, and leads 13 and 14. This assembly is then withdrawn from the silicone resin solution and maintained at an elevated temperature, such as a temperature of 150° C. for several hours to evaporate the solvent from the silicone resin solution and to cure the silcone resin to provide a hard coating of silicone resin over the entire assembly. In the drawing, silicone resin coating 18 is shown on the outside of housing 11. After the curing of this silicone resin, housing top 15 with insulators 16 and housing bottom 17 are affixed to close the entire transformer housing. At this point the pigmented coating composition of the present invention is applied to the outside surface of the transformer housing 11 by any desirable means such as by painting or spraying. For purposes of describing the present invention, the pigmented coating composition of the present invention is shown as layer 19 in the drawing.

The pigmented coating composition of the present invention dries by evaporation of the solvent so that the transformer may be dried by merely allowing it to stand in air until the solvent has evaporated or alternatively the entire assembly may be maintained at an elevated temperature such as a temperature of from 50 to 150° C. for a time sufficient to drive off the solvent, resulting in a hard pigmented coating layer 19 which may be any desired color. This layer 19 will adhere firmly to the surface of the silicone resin layer 18 and provide transformers of satisfactory and uniform appearance.

The following examples illustrate the preparation of the pigmented coating compositions of the present invention and the application of these compositions to articles containing a silcone resin coating. In particular, in each example the pigmented coating composition was applied to the outside of a steel transformer housing which had been previously coated with a silicone resin during impregnation of the housing and its core assembly with the resin. The core assembly comprised a soft iron core surrounded by primary and secondary coil of copper wire insulated with a cured polyester resin which was the reaction product of a mixture of ingredients in the ratio of 3 moles of dimethyl terephthalate, 2 moles of ethylene glycol and 1 mole of glycerine. In each case of the silicone resin coated housing had been heated at a temperature of 130° C. for one hour to evaporate the solvent from the silicone resin employed and to cure the silicone resin. Except where otherwise indicated in the examples, all parts are by weight.

*Example 1*

A solution was prepared by dissolving 30 parts of a vinyl toluene butadiene copolymer resin prepared from 80 parts vinyl toluene and 20 parts butadiene, 40 parts of a chlorinated biphenyl containing 54 percent by weight chlorine, 30 parts of a chlorinated terphenyl containing 60 percent by weight of chlorine in 100 parts by weight of a blend of 80 parts of an aliphatic hydrocarbon solvent having a boiling point of from 120° C. to 140° C. and 20 parts xylene. A pigment consisting of 43 parts titanium dioxide, 28.5 parts graphitic mica and 28.5 parts aluminum silicate was added to the solution in an amount sufficient to provide 80 percent by volume of pigment based on the volume of the vinyl toluene butadiene copolymer resin, the chlorinated diphenyl, and the chlorinated terphenyl to form a pigmented coating composition within the scope of the present invention. This pigmented coating composition was sprayed on the surface of a transformer housing which had been previously coated by methods described above with a 50 percent solids silicone resin containing 7.5 mole percent methylsiloxane units, 2.75 mole percent phenylsiloxane units, 4.25 mole percent dimethylsiloxane units, and 2.25 mole percent diphenylsiloxane units. This pigmented composition was allowed to air dry for 24 hours to yield a gray transformer housing. The pigmented coating composition adhered firmly to the silicone resin coating and there was no evidence of any attack of the silicone resin coating by the pigmented coating composition.

When the procedure of this example was repeated except that the chlorinated terphenyl was omitted from the pigmented composition, the coating composition would not adhere adequately to the silicone resin. When the procedure of this example was again repeated but with the chlorinated biphenyl omitted from the pigmented coating composition, there was again a failure of adequate adhesion between the pigmented coating composition and the silicone resin. When the procedure of this example was repeated except that a butadiene-styrene copolymer resin formed from 80 parts styrene and 20 parts butadiene was substituted for the vinyl toluene-butadiene copolymer and when toluene was substituted for the solvent of the example, it was found that while the pigmented coating composition adhered firmly to the silicone resin surface, the silicone resin surface had been softened to such an extent that it pulled away from the metallic housing of the transformer.

*Example 2*

The procedure of Example 1 was repeated except that the vinyl toluene butadiene copolymer, the chlorinated biphenyl and the chlorinated terphenyl were employed in the amounts of 33⅓ parts of each component. The resulting coated transformer housing had a satisfactory appearance and there was no evidence of failure of adhesion between the pigmented coating composition and the silicone resin and no evidence of a failure of adhesion between the silicone resin and the metallic housing of the transformer.

Example 3

A pigmented coating composition was prepared by dissolving 50 parts of a vinyl toluene butadiene copolymer prepared from 90 parts vinyl toluene and 10 parts butadiene, 30 parts of a chlorinated biphenyl containing 60 percent chlorine and 20 parts of a chlorinated terphenyl containing 64 percent chlorine in 100 parts of the solvent described in Example 1. To this composition was added a sufficient amount of the pigment described in Example 1 to provide 70 parts by volume of pigment per 100 parts by volume of the vinyl toluene butadiene copolymer, the chlorinated biphenyl and the chlorinated terphenyl. This solution was sprayed onto the surface of a transformer housing which had been previously coated with a silicone resin composed of equal number of moles of phenyltrichlorosilane and dimethyldichlorosilane. After air drying the pigmented coating composition, no evidence was found of lack of adhesion between the pigmented coating composition and the sillicone resin and there was no evidence of attack of the silicone resin coating by the pigmented coating composition.

Example 4

The procedure of Example 3 was repeated except that the vinyl toluene butadiene copolymer, the chlorinated biphenyl and the chlorinated terphenyl were employed in the ratios of 50 parts of the vinyl toluene butadiene copolymer, 20 parts of the chlorinated biphenyl and 30 parts of the chlorinated terphenyl. After air drying this composition, the results were comparable to the results obtained in Example 3.

While the foregoing examples have described many of the variations of the ingredients employed in the coating compositions of the present invention, it should be understood that other silicone resins than the resins specifically illustrated in the examples can be employed as an intermediate coating between the pigmented coating compositions of the present invention and the article to be coated. In addition, many variations are apparent with regard to the particular vinyl toluene butadiene copolymers, the particular chlorinated biphenyls and the particular chlorinated terphenyls which can be employed in the practice of the present invention. Similarly, the ratio of these three last mentioned ingredients can be varied within the limits previously described.

While the pigmented coating composition of the present invention has been particularly described with regard to its applications to the surface of a transformer which had been previously coated with a silicone resin, it should be understood that these pigmented coating compositions are also useful in the coating of untreated metal surfaces and in the coating of non-metallic surfaces such as wood and plastic materials. In such cases the pigmented coating compositions of the present invention may be applied directly to the surface to be treated without the intermediate coat of silicone resin. In addition to the use of this coating composition on transformers, it should be understood that this coating composition can be employed as a surface coating on other electrical apparatus and on articles of all types.

What I claim as new and desire to secure by Letters Patent of the United States is:

1. A composition of matter consisting essentially of a blend of (a) from 25 to 60 parts by weight of a copolymer of a major portion of vinyl toluene and a minor portion of butadiene, (b) from 15 to 40 parts by weight of a chlorinated biphenyl, (c) from 15 to 40 parts by weight of a chlorinated terphenyl, and (d) a pigment.

2. A composition of matter consisting essentially of a dispersion of a pigment in a solution of (a) from 25 to 60 parts by weight of a copolymer of a major portion of vinyl toluene and a minor portion of butadiene, (b) from 15 to 40 parts by weight of a chlorinated biphenyl, and (c) from 15 to 40 parts by weight of a chlorinated terphenyl.

3. An article of manufacture comprising a base, a silicone resin coating on said base, and a coating on said silicone resin coating consisting essentially of (a) from 25 to 60 parts by weight of a copolymer of a major portion of vinyl toluene and a minor portion of butadiene, (b) from 15 to 40 parts by weight of a chlorinated biphenyl and (c) from 15 to 40 parts by weight of a chlorinated terphenyl, and (d) a pigment.

4. In a transformer having a metal housing, a silicone resin coating on the exterior of said housing, and a pigmented coating composition in tightly adherent relationship to said silicone resin coating, said pigmented composition consisting essentially of a blend of (a) from 25 to 60 parts by weight of a copolymer of a major portion of vinyl toluene and a minor portion of butadiene, (b) from 15 to 40 parts by weight of a chlorinated biphenyl, (c) from 15 to 40 parts by weight of a chlorinated terphenyl, and (d) a pigment.

References Cited in the file of this patent

UNITED STATES PATENTS

| | | |
|---|---|---|
| 2,158,281 | Ford et al. | Nov. 16, 1939 |
| 2,335,097 | Aken | Nov. 23, 1943 |
| 2,416,955 | Rosch | Mar. 4, 1947 |
| 2,810,707 | Nagle | Oct. 22, 1957 |